US008541117B2

(12) United States Patent
Van Schyndel

(10) Patent No.: US 8,541,117 B2
(45) Date of Patent: Sep. 24, 2013

(54) LOW NOISE BATTERY WITH A MAGNETIC COMPENSATION STRUCTURE FOR WIRELESS MOBILE COMMUNICATION DEVICE

(75) Inventor: Andre J. Van Schyndel, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 735 days.

(21) Appl. No.: 12/616,641

(22) Filed: Nov. 11, 2009

(65) Prior Publication Data

US 2011/0111267 A1    May 12, 2011

(51) Int. Cl.
*H01M 2/00*    (2006.01)
(52) U.S. Cl.
USPC .......................................................... 429/10
(58) Field of Classification Search
USPC .......................................................... 429/10
See application file for complete search history.

(56) References Cited

U.S. PATENT DOCUMENTS

2007/0269685 A1 *  11/2007  Chu et al. ........................... 429/3

* cited by examiner

*Primary Examiner* — Ula C Ruddock
*Assistant Examiner* — Frank Chernow
(74) *Attorney, Agent, or Firm* — Quarles & Brady LLP

(57) ABSTRACT

A battery has an electrode assembly that includes a positive electrode, a negative electrode, and a layer of electrolyte between the positive electrode and the negative electrode. An electric current flow in the positive electrode is unmatched to an electric current flow in the negative electrode, thereby producing a first magnetic field. A magnetic compensation structure is adjacent to the electrode assembly and has body of electrically conductive material connected to one of the positive electrode and the negative electrode. The electric current flowing through the electrode assembly also flows through the body in a pattern that matches the pattern of unmatched electric current in the electrode assembly. As a result a second magnetic field is produced by the magnetic compensation structure that opposes the first magnetic field thereby mitigating magnetic noise from the battery.

44 Claims, 6 Drawing Sheets

↑ CURRENT IN NEGATIVE ELECTRODE

↓ CURRENT IN POSITIVE ELECTRODE

LOW NOISE BATTERY WITH A MAGNETIC COMPENSATION STRUCTURE FOR WIRELESS MOBILE COMMUNICATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

TECHNICAL FIELD

The present disclosure relates generally to batteries, and more particularly to a battery characterized by low magnetic interference and suitable for powering mobile communication devices.

BACKGROUND OF THE DISCLOSURE

Mobile communication devices are popular for business and personal use. Such devices include Personal Digital Assistants (PDAs), cellular phones and smart phones. These devices provide wireless two-way voice and data communication over wireless networks such as GSM/GPRS, CDPD, TDMA, iDEN Mobitex, DataTAC, EDGE or UMTS networks, and broadband networks like Bluetooth® wireless technology developed by Bluetooth SIG, Inc., Bellevue, Wash., U.S.A. and variants of IEEE standard 802.11.

Any electric current generates a magnetic field as given by the Biot-Savart law. If there is second electric current of similar magnitude and of opposite direction in close proximity to the first electric current, a similar but opposite magnetic field is generated. This second electric current is said to match the first electric current and effectively cancels the magnetic field generated by the first electric current. This technique of "matching currents" is a useful method to suppress magnetic fields.

It is desirable that the electromagnetic fields generated by mobile communication devices be minimized for health reasons and to reduce interference with other nearby electronic devices.

DETAILED DESCRIPTION

Figure 1:
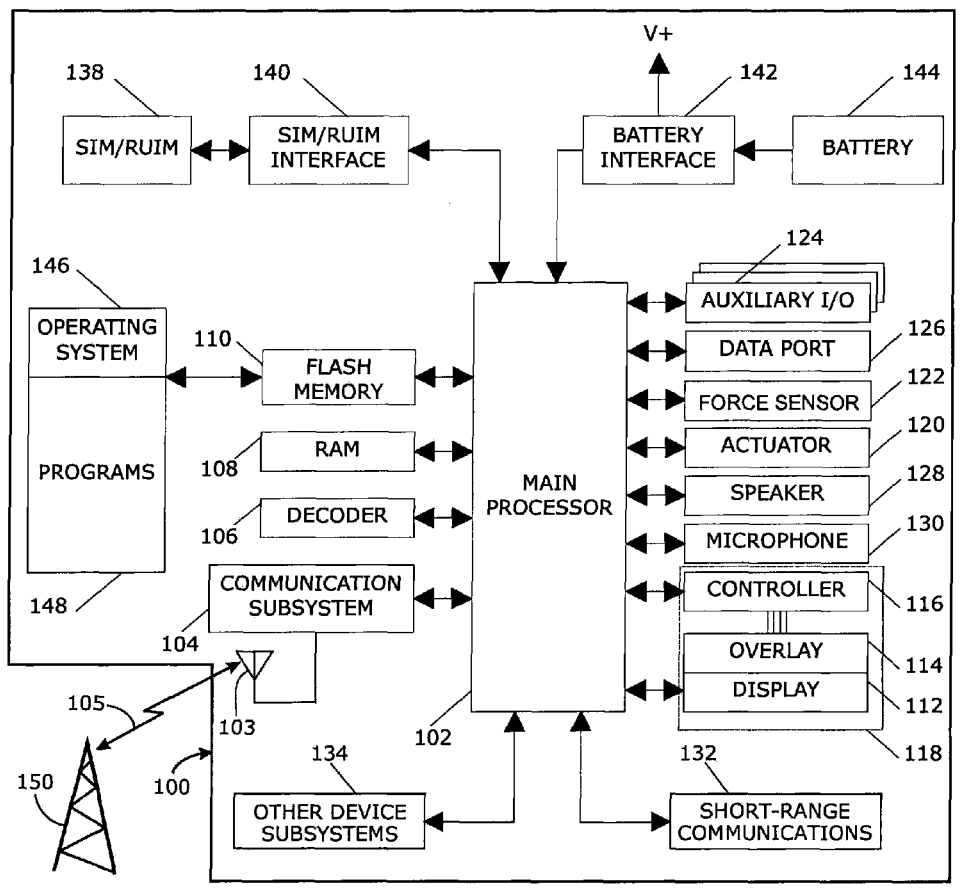
FIG. 1 is a block diagram illustrating a wireless mobile communication device in accordance with the present disclosure.

The battery that powers a mobile communication device is a source of magnetic fields due to an internal asymmetric flow of electric current. A separate conductor, commonly called a "tab", is attached to each battery electrode and to an exterior terminal. For safety and manufacturability reasons, the tabs often are connected to the respective electrodes at spaced apart locations in the assembled battery. The difference in the tab locations creates different electric current flow patterns in the positive and negative electrodes, thereby resulting in unmatched currents and non-cancelling magnetic fields. In other words the flow of electric current is distributed differently throughout the two electrodes. Thus the battery produces a net magnetic field that may adversely affect external elements.

Magnetic noise associated with these magnetic fields may be generated by a battery in a mobile communication device due to current draw associated with GSM radio transmission. Accordingly, it is desirable to minimize magnetic interference from mobile communication devices in general and to minimize magnetic interference from mobile communication device batteries due to current draw on the battery.

Embodiments disclosed herein provide a magnetic compensation structure that may effectively eliminate the net magnetic field associated with batteries which have been proven safe and easy to manufacture. Such batteries typically have some currents which are not matched (usually, these can be designed to be close to the outer surface of the battery). The present concept involves providing an electrical current distribution adjacent to the outer surface of the battery, which substantially matches those unmatched currents.

As used herein, electric currents in two components, such as battery electrodes, are considered to be "matched" when they are close in proximity, substantially equal in magnitude, and travel in opposite directions, also referred to as the currents being anti-parallel. Any substantial difference in either magnitude or anti-parallel orientation of the two such currents result in them being "unmatched." Similarly, the electric current patterns in two different components are considered to be "matched" when the currents at corresponding locations between the two components are substantially equal in magnitude, travel in opposite directions and are close to each other.

The battery has an electrode assembly that includes a positive electrode and a negative electrode separated from each other by at least one layer of electrolyte. A positive tab is connected to the positive electrode and a negative tab is connected to the negative electrode. The magnetic compensation structure has a body of electrically conductive material, that may, for example, comprise the same material as one of the positive or negative electrode. First and second compensation conductors are electrically connected to the body and one of the first and second compensation conductors is connected to one of the positive tab and negative tab of the electrode assembly. The first and second compensation conductors and the body are configured to produce an electric current pattern that is similar to the pattern of unmatched electric currents in the electrode assembly.

The magnetic compensation structure is mounted in close proximity to the portion of the electrode assembly in which the unmatched electric currents flow, so that the electric current pattern in the body matches the unmatched electric currents in the adjacent portion of the electrode assembly. This results in the current flow in the magnetic compensation structure producing a magnetic field that opposes, and thus cancels, the magnetic field produced by the unmatched electric currents in the electrode assembly.

With initial reference to FIG. 1, the battery disclosed herein may be used to power a mobile communication device 100. That mobile communication device includes a number of components such as a processor 102 that controls the overall operation of the mobile communication device. Communication functions, including data and voice communications, are performed through a communication subsystem 104 that includes radio frequency transceiver connected to an antenna 103. Data received by the mobile communication device 100 is decompressed and decrypted by a decoder 106. The communication subsystem 104 and an antenna 103 receive messages from and send messages to a wireless network 150 via a radio frequency signal 105. The wireless network may be, but not limited to, data-centric wireless networks, voice-centric wireless networks, and dual-mode networks that support both voice and data communications over the same physical stations. The mobile communication device 100 is a battery powered device and includes a battery interface 142 for receiving one or more rechargeable batteries 144.

The processor 102 also interacts with additional components such as a random access memory (RAM) 108, a flash memory 110, a display 112 with a touch sensitive overlay 114 connected to an electronic controller 116 that together make up a touch sensitive display 118, an actuator 120, a force sensor 122, an auxiliary input/output (I/O) subsystem 124, a data port 126, a speaker 128, a microphone 130, a Subscriber Identity Module or a Removable User Identity Module (SIM/RUIM) card 138 inserted into a SIM/RUIM interface 140 for communication with the wireless network 150, short-range communications subsystem 132 and other device subsystems 134. The processor 102 interacts with the touch-sensitive overlay 114 via the electronic controller 116.

The mobile communication device 100 also includes an operating system 146 and software components 148 that are executed by the processor 102 and are typically stored in a persistent store such as the flash memory 110. Additional applications may be loaded onto the mobile communication device 100 from the wireless network 150, the auxiliary I/O subsystem 124, the data port 126, the short-range communications subsystem 132, or any other suitable device subsystem 134.

Figure 2:
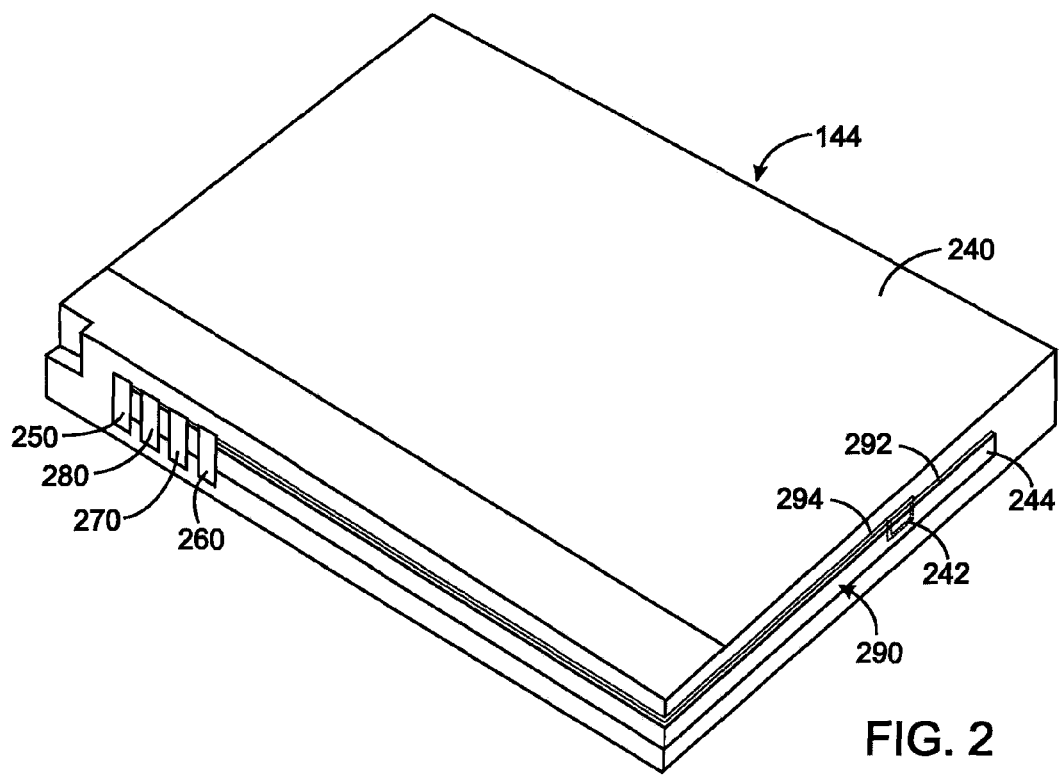
FIG. 2 is a perspective view of a battery for powering the wireless mobile communication device of FIG. 1.

FIG. 2 shows a battery 144 for powering a mobile communication device 100. The battery is assembled inside a case 240 and includes a positive terminal 250, a negative terminal 260, and may include a temperature terminal 270 and a cryptography terminal 280 for testing manufacturer's authenticity of the battery 144. Although not shown, the battery 144 may include an internal microprocessor and a switch in series with the positive and negative terminals 250 and 260 which is opened by the internal microprocessor if the battery discharges below a predetermined level, in order to avoid damage to the battery. Likewise, if the battery temperature elevates beyond a predetermined level, as indicated on the temperature terminal 270, the microprocessor may cause the switch to open.

A sandwich electrode assembly is located within the case 240 and comprises coated metallic films that according to the most common configurations have sections that are layered on top of each other, either in a stacked configuration, folded back and forth into a pleated configuration like an accordion (referred to as a Z-type electrode assembly), or rolled up and flattened (referred to as a "jellyroll" electrode assembly). Reference will be made hereinafter to the construction and design of "jellyroll" electrode assemblies, although a person of skill in the art will appreciate that the principles set forth herein apply equally to other designs and configurations of electrode assemblies.

Figure 3:
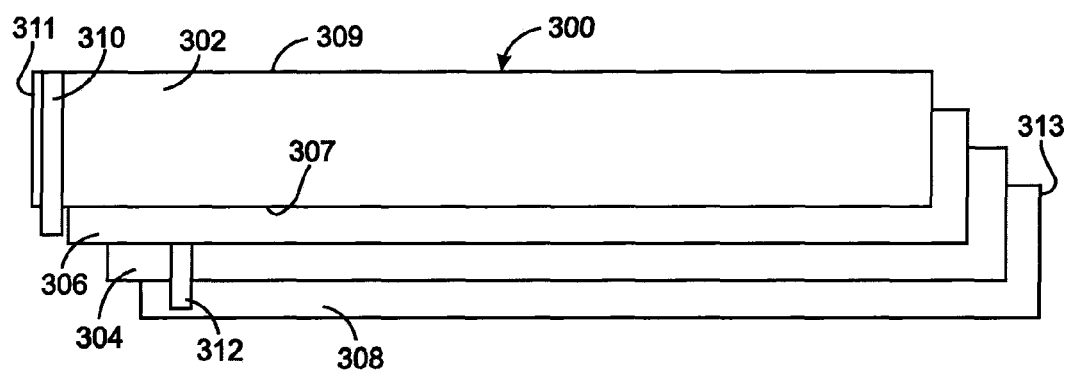
FIG. 3 is a schematic representation of positive and negative electrodes, of one embodiment of a battery, in an unrolled configuration.
Figure 4:
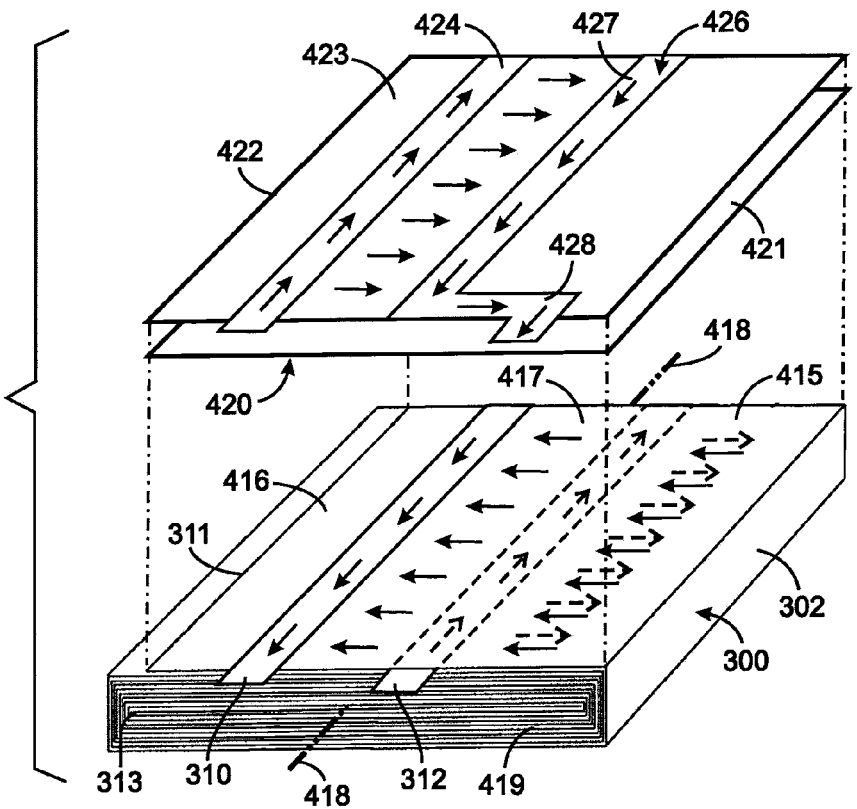
FIG. 4 is an exploded view of the positive and negative electrodes of FIG. 3 rolled-up in a first electrode assembly with a magnetic compensation structure associated therewith.

One such jellyroll type layered first electrode assembly 300 is schematically depicted in FIG. 3 in its un-rolled state and in FIG. 4 in its final rolled-up state. The first electrode assembly 300 comprises first and second elongated sheets, or strips, that respectively form a positive electrode 302 (cathode) and a negative electrode 304 (anode) sandwiched together with an insulating intermediate separator sheet 306 of insulating material between them. An outer separator sheet 308 of insulating material is beneath the negative electrode and may curl around the end of the positive electrode 302 at the innermost section of the jellyroll, so as to electrically isolate the positive and negative electrodes. The intermediate separator sheet 306 contains an electrolyte thereby forming a layer of electrolyte. The electrolyte may comprise lithium salts, for example $LiPF6$, $LiBF4$, or $LiClO_4$, in an organic solvent, such as ether, an acid such as in a lead-acid battery, an alkaline electrolyte usually potassium hydroxide in a nickel metal hydride or nickel cadmium. The positive electrode 302 may comprise a thin sheet of aluminum (e.g., 15 μm) that is coated on both sides (e.g. 60-70 μm per side) with lithium cobalt oxide ($LiCoO_2$), or other suitable material, while the negative electrode 304 may comprise a thin sheet of copper foil (e.g. 10 μm) that is coated on both sides with graphite (e.g. 60-70 μm per side), such that electrical current flows from the cathode to the anode. The intermediate separator sheet 306 has openings (e.g. 20 μm wide) therein that allow the electrolyte liquid to permeate between the positive and negative electrodes 302 and 304. The intermediate separator sheet 306 thus physically separates the two electrode strips while allowing ions to flow between the electrodes.

In the battery field, an electrical conductor connected to an electrode is referred to as a "tab." A positive tab extends across the width of and contacts the positive electrode 302 between first and second opposing edges 307 and 309 adjacent a first end 311 of the electrode assembly. The positive tab 310 is electrically connected directly to the positive electrode and has a greater electrical conductivity than the material of the positive electrode 302. For example, the positive tab 310 may be formed of nickel plated steel and be approximately ten times thicker that the positive electrode 302, however, other types of tabs conventionally employed in batteries may be used. As used herein the term "connected directly" and the concept of a direct connection means that two associated components as connected so as be at the same voltage potential. A negative tab 312 extends across and contacts the width of the negative electrode 304 between third and fourth opposing edges. The negative tab 312 also is adjacent the first end 311, but is spaced farther inward than the positive tab 310 is spaced from the first end. The negative tab 312 may be formed of the same material as the positive tab 310 and is electrically connected to the negative electrode 304. For example, the positive and negative tabs 310 and 312 are attached to the respective positive and negative electrode 302 and 301 by ultrasonic welding.

With reference to FIG. 4, the first electrode assembly 300 has sections that are layered on top of one another, in this case rolled up in a spiral manner lengthwise about a roll axis 418 beginning at the second end 313 that is opposite to the first end 311 where the positive and negative tabs 310 and 312 are located. The resultant electrode assembly has a plurality of layers with each layer comprising a section of each of the positive electrode 302, the negative electrode 304, the intermediate separator sheet 306 and the outer separator sheet 308. The first electrode assembly 300, therefore has a major surface 416 formed by an outer layer at which the first end 311 is located. The positive and negative tabs 310 and 312 project outward from a side of the layered first electrode assembly 300 that has a spiraling edge of each electrode 302 and 304.

Figure 5:
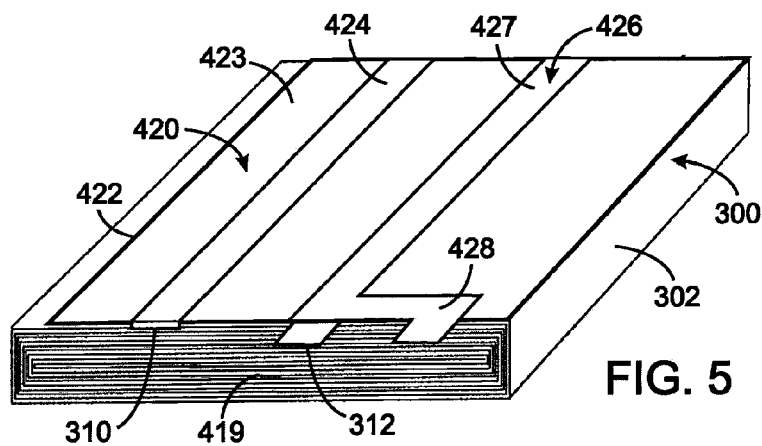
FIG. 5 is a shows the magnetic compensation structure abutting and connected to the rolled-up an electrode assembly.

With reference to FIGS. 4 and 5, the battery 144 further includes a magnetic compensation structure 420 secured to the major surface 416 and thus to an outer layer of the first electrode assembly 300. The magnetic compensation structure 420 includes a body 422 forming a base and having a sheet-like shape and may be formed of the same material as the positive electrode 302. A first compensation conductor 424 is in electrical contact with a major surface 423 of the body 422 that is remote from the first electrode assembly 300 and extends across that major surface between opposing edges. The first compensation conductor 424 has the same size and shape as the positive tab 310 of the first electrode assembly and is located on the body 422 so as to directly and entirely overlie that positive tab when the first magnetic compensation structure 420 is assembled with the first electrode assembly. A second compensation conductor 426 also is in electrical contact with the magnetic compensation structure body 422. The second compensation conductor 426 has a primary region 427 that has the same size and shape as the negative tab 312 on the first electrode assembly 300. That primary region 427 is located on the major surface 423 directly and entirely overlying the negative tab 312 when the magnetic compensation structure 420 is assembled with the first electrode assembly 300. Both the first and second compensation conductors 424 and 426 may be fabricated of the same material as the positive and negative tabs 310 and 312. The second compensation conductor 426 has an offset section 428 that projects from the edge of the magnetic compensation structure body 422 in a manner that is offset from the projection of the negative tab 312 from the side 419 of the first electrode assembly 300, as shown in FIG. 5. For example, the magnetic compensation structure 420 is approximately 15 µm thick and each conductor 424 and 426 is approximately 150 µm thick. A layer of insulating material 421 separates the magnetic compensation structure 420 from the first electrode assembly 300.

When the magnetic compensation structure 420 is assembled with the first electrode assembly 300, an end of the positive tab 310 that projects beyond side 419 of that electrode assembly and a portion of the first compensation conductor 424 that similarly projects beyond an edge of the body 422 are electrically connected directly together, as seen in FIG. 5. With additional reference to FIG. 2, the combination of the first electrode assembly 300 and the magnetic compensation structure 420 is enclosed the metal battery case 240, that has an external lead 290 extending around its outer surface to the positive and negative terminals 250 and 260. The external lead 290 has separate strip-like positive and negative conductors 292 and 294 with an insulating layer (not shown) between the positive and negative conductors 292 and 294.

The end of the negative tab 312 is connected via an insulated feedthrough 242 on the case to the external negative conductor 294. The second compensation conductor 426 is connected to the case directly inside point 244 and the external positive conductor 292 is attached to the case 240 at point 244 and thus is electrically connected through the case to the second compensation conductor 426. Alternatively, one or both of the positive and negative conductors 292 and 294 may be contiguous extensions of the negative tab 312 and the second compensation conductor 426 and extend through apertures in the battery case. The positive and negative conductors 292 and 294 overlie each other which provides further current matching to mitigate magnetic noise. As a further variation, the offset section 428 of the second compensation conductor 426 can be eliminated so that both the second compensation conductor and the negative tab 312 project through the same aperture in the battery case 240. This enables the positive strip conductor to be against the battery case, which if made of metal typically is connected to the positive terminal 250.

Although the body 422 of the first magnetic compensation structure 420 in the above example is formed of the same material as the positive electrode 302 and the first and second compensation conductors 424 and 426 are fabricated of the same material and thickness as the positive and negative tabs 310 and 312, the materials used in the magnetic compensation structure 420 may be different than those used in the first electrode assembly 300. The first ratio of the two dimensional conductivity between the first compensation conductor 424 and the magnetic compensation structure body 422 is substantially identical to a second ratio of the two dimensional conductivity between the positive tab 310 and the positive electrode 302. Furthermore, a third ratio of the two dimensional conductivity between the second compensation conductor 426 and the body 422 is substantially identical to a fourth ratio of the two dimensional conductivity between the negative tab 312 and the negative electrode 302. This use of substantially identical two dimensional conductivity ratios creates relatively equal current densities in both first the electrode assembly and in the magnetic compensation structure, as will be described. As used herein, two dimensional conductivity is equal to the thickness of a given material, e.g., the thickness of positive electrode 302 or negative electrode 304, divided by the resistivity of the material. When the respective ratios of the two dimensional conductivities are substantially equal, at least fifty percent of a first magnetic field produced by the first electrode assembly 300 will be cancelled by a second magnetic field produced by the first magnetic compensation structure 420, as will be described.

Figure 6:
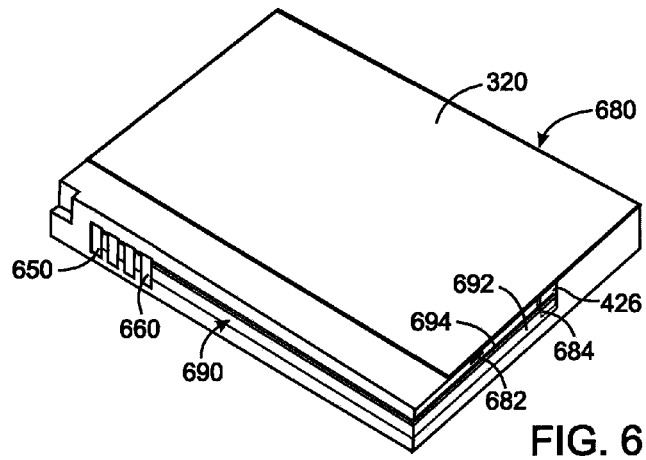
FIG. 6 a perspective view of a battery with the magnetic compensation structure mounted on an exterior surface of the battery case.

As an alternative to mounting the first magnetic compensation structure 420 on the first electrode assembly 300, the first electrode assembly is enclosed in the battery case 680 shown in FIG. 6 and the first magnetic compensation structure 420 is attached to the exterior surface of the battery case. In this instance, a portion of the first compensation conductor 424 is connected via a first insulated feedthrough 682 in the battery case 680 to the positive tab 310 of the first electrode assembly. The second compensation conductor 426 is connected to the positive conductor 692 of an external lead 690 extending around the outer surface battery case 680 to the positive terminal 650. The negative conductor 694, that is connected to the negative terminal 660, is connected via a second insulated feedthrough 684 on the battery case 680 to the negative tab of the first electrode assembly. A label or other covering can extend over the magnetic compensation structure 420 on the exterior of the battery case.

Regardless of which of these placements of the first magnetic compensation structure 420 with respect to the first electrode assembly 300 is used, noise mitigation occurs. With particular reference to FIG. 4, the electric current within the outer layer of the first electrode assembly 300 flows as shown by the arrows. Specifically, the current flow through the negative electrode 304 and the negative tab 312 is depicted by dashed arrows and the current flow through the positive electrode 302 and the positive tab 310 is depicted by solid arrows with triangular heads. Currents of equal magnitudes flow in opposite directions in a first section 415 of the top layer and in the other layers of the first electrode assembly 300. The arrows also indicate that the current flows in the positive and negative tabs 310 and 312 are parallel to the length dimension of each tab. The currents in the positive and negative electrodes of section 415 are considered to be anti-parallel in that they are of substantially equal magnitude and flow in opposite parallel directions. Since the current flow in the negative electrode 304 terminates at the negative tab 312, only current flowing in the positive electrode 302 occurs in a second section 417 of the top layer that is between the two tabs 310 and 312. Thus unmatched current flows in the second section 417 and that current flow is perpendicular to the length dimension of both the positive and negative tabs 310 and 312.

The current exits first electrode assembly 300 at the exposed end of the positive tab 310 that projects from the side 419. That exiting current enters the adjacent end of the first compensation conductor 424 traveling along its length as shown by the arrows in FIG. 4. From that first compensation conductor 424 the current travels through the body 422 of the magnetic compensation structure 420 in a perpendicular direction toward the second compensation conductor 426. Note that the current flow in the body 422 is anti-parallel to the current flow in the upper layer of first electrode assembly 300. The current then continues to flow along the length of the second compensation conductor 426 to the offset section 428 from which the current exits the magnetic compensation structure 420.

The direction of the current through the first compensation conductor 424 is significant to the magnetic noise reduction. Specifically, the current flow in the first compensation conductor 424 is equal in magnitude and opposite in direction to the current flow in the positive tab 310 that lies directly there below. Because the first compensation conductor 424 has the same size (e.g., length and width) and shape as the positive tab 310 and, in the orientation illustrated, is directly on top of that positive tab (i.e. entirely overlies the positive tab) the current flows in the first compensation conductor and the positive tab are matched. The current flow in body 422 between the two compensation conductors 424 and 426 is anti-parallel to the current flow between the positive and negative tabs 310 and 312 of the first electrode assembly 300. Similarly the flow of current through the second compensation conductor 426 is equal in magnitude and opposite in direction to the current flow through the negative tab 312 of the first electrode assembly. The current flows in the second compensation conductor 426 and the negative tab 312 are matched, because the second compensation conductor has the same size and shape as the negative tab and, in the orientation illustrated, is directly on top of that negative tab (i.e. entirely overlies the negative tab). Because the current flow through the magnetic compensation structure 420 is equal and opposite to the current flow in the section of the first electrode assembly there below, a first magnetic field created by the unmatched currents in the first electrode assembly 300 is canceled by an opposing second magnetic field produced by the unmatched currents in the magnetic compensation structure 420. Thus the operation of the magnetic compensation structure 420 at least partially cancels the magnetic field produced by the first electrode assembly 300, mitigating the magnetic interference that would otherwise be produced by the battery 144.

As general concept, the structure of the magnetic compensation structure 420 reproduces the unmatched current flow pattern in the first electrode assembly 300, but in the opposite direction. This opposing current flow patterns produce canceling magnetic fields and reduce the magnetic noise from the battery.

Furthermore since the outer surface of the first electrode assembly 300 is formed by the positive electrode 302 and since current from that positive electrode also flows through the first magnetic compensation structure 420, any short circuit that may exist between those components will not create a hazard because the voltage in those adjacent components is very nearly equal.

Figure 7:
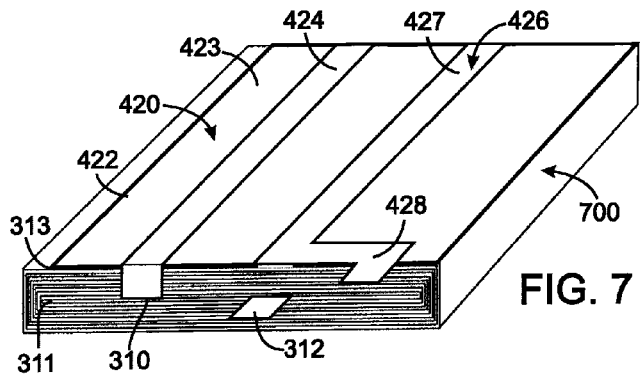
FIG. 7 illustrates alternative manner in which the assembly of the positive and negative electrodes of FIG. 3 can be rolled up and connected to a magnetic compensation structure.

FIG. 7 illustrates an alternative electrode assembly 700 in which the first end 311 adjacent the two tabs 310 and 312 is located at the center of the roll and the second end 313 is at the outer layer. This alternative employs the first magnetic compensation structure 420 that is the same as described with respect to the embodiment in FIG. 4. This alternative electrode assembly 700 is functionally equivalent to the previous embodiment described in detail immediately above.

A variation of the magnetic compensation concept can be used with the alternative electrode assembly 700 in which the first end 311 near the two tabs 310 and 312 is in the center of the roll and the second end 313 is at the outer layer. In this situation, the unmatched currents are at the center of the jellyroll electrode assembly 700. To mitigate the resultant magnetic fields from this electrode assembly, two magnetic compensation structures are placed on both major surfaces (e.g., the top and bottom surfaces in FIG. 7) of the electrode assembly. Two such magnetic compensation structures also can be used with a stacked electrode assembly in which the unmatched currents are distributed throughout the thickness of that assembly. In both applications, the two magnetic compensation structures are connected in parallel with each other and in series with one of the electrode assembly tabs.

Figure 8:
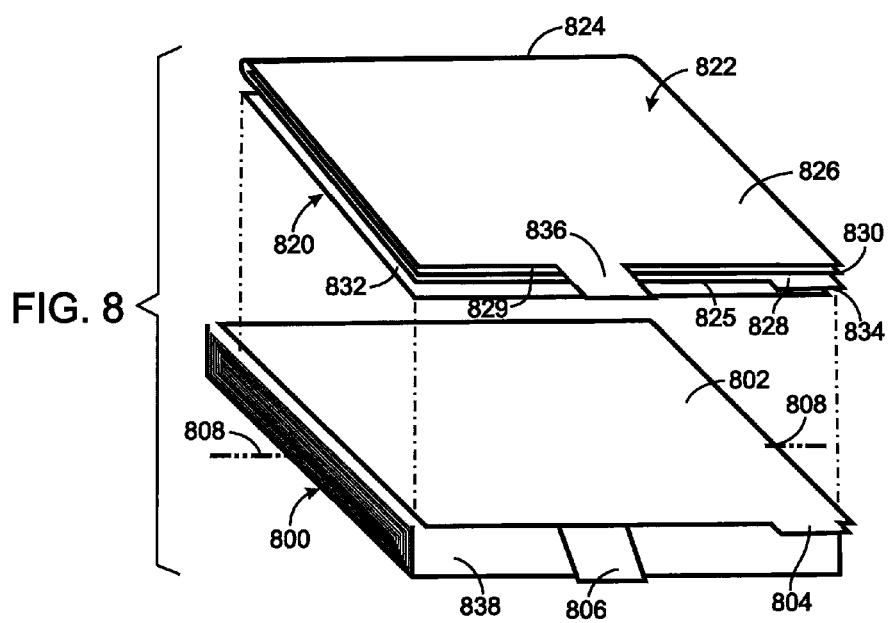
FIG. 8 is an exploded view of the positive and negative electrodes of FIG. 3 rolled-up in a second electrode assembly with a magnetic compensation structure associated therewith.

With reference to FIG. 8, a second electrode assembly 800 has a positive electrode and a negative electrode sandwiched together with an intermediate separator sheet and electrolyte between the positive electrode and the negative electrode and an outer separator sheet in the laminated configuration as shown in FIG. 3. In contrast, however, the positive tab 804 and the negative tab 806 project outward from the edge at the end of each respective electrode. In other words, the positive and negative tabs on the jellyroll type layered second electrode assembly 800 extend outward from an edge of that assembly that is parallel to the roll axis 808 about which that electrode assembly is rolled up in the spiral manner. Another difference, with respect to the first electrode assembly 300 depicted in FIG. 3, is that the positive and negative tabs 804 and 806 are extensions of the material of the respective electrode and are not separate metal elements that are electrically connected to the body of the electrode.

Figure 9:
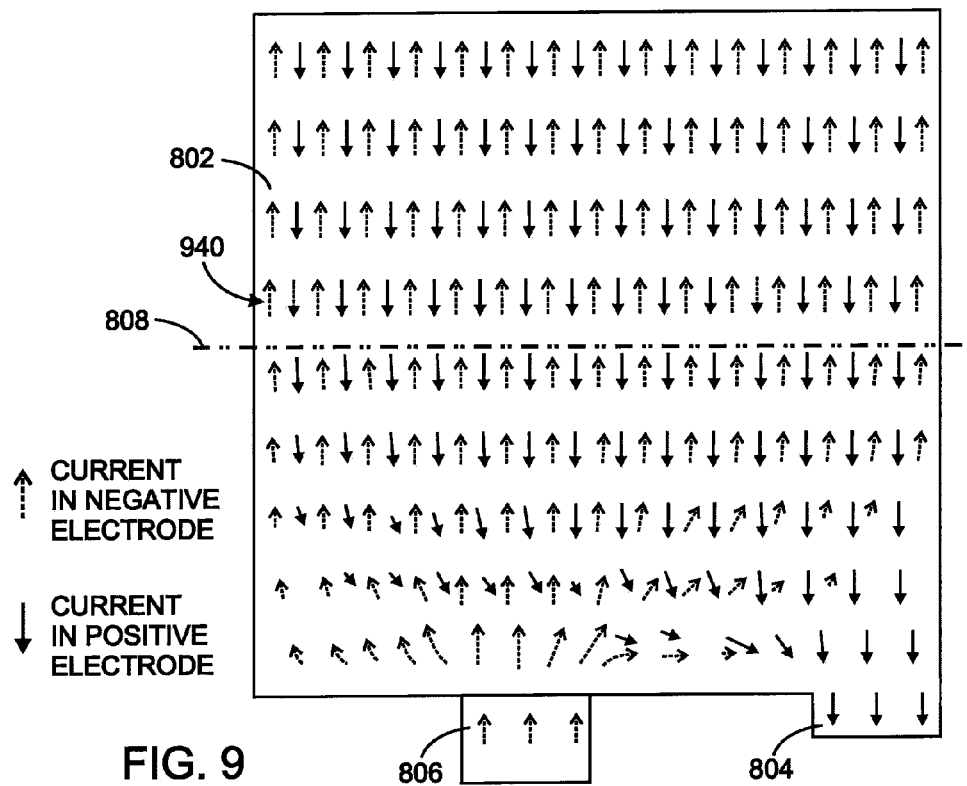
FIG. 9 is a graphical depiction of the flow of electric current in the outer layer of the positive and negative electrodes in the second electrode assembly.

This tab and electrode arrangement results in current flowing asymmetrically through the top layer of the second electrode assembly, as depicted by the arrows in FIG. 9. Here dashed arrows pointing away from the negative tab 806 represent the current flow through the negative electrode and solid arrows pointing generally toward the positive tab 804 depict the current flow through the positive electrode. The length of each arrow roughly indicates the relative magnitude of the electric current at the associated location in the positive or negative electrode. It is apparent from this representation of current flow that the respective currents near the tabs 804 and 806 of the electrodes are unequal in both direction and magnitude. This is unlike the current flow in the previous embodiments that utilized parallel tabs extending across the width of the positive and negative electrodes, thereby creating current that flowed in parallel paths perpendicular to both the positive and negative tabs. Nevertheless, the present magnetic compensation concept can be applied to produce a magnetic field which tends to cancel the magnetic field resulting from the unmatched currents in second electrode assembly 800.

Figure 10:
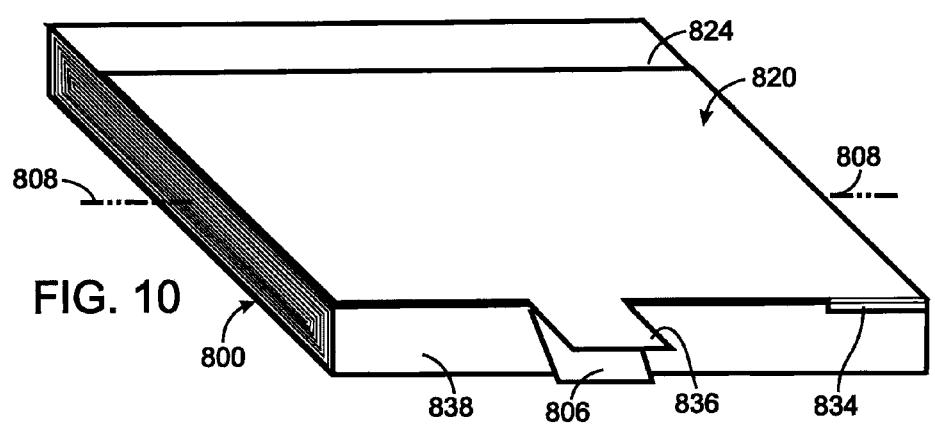
FIG. 10 illustrates the magnetic compensation structure abutting and connected to the second electrode assembly.

Referring to FIGS. 8 and 10, a second magnetic compensation structure 820 has a conductive body 822 creating a base formed by a sheet of electrically conductive material, such as the same material used for the positive electrode 802. The sheet of the body 822 is folded over on itself along a fold axis 824 thereby providing an upper first portion 826 and a lower second portion 828 in parallel planes. A first sheet 830 of insulating material insulating material is sandwiched between the two portions. An second sheet 832 of insulating material forms the lower surface of the second magnetic compensation structure 820 to provide electrical insulation with respect to the second electrode assembly 800. It should be understood that for illustrative purposes, gaps are shown between the various elements of the second magnetic compensation structure 820, whereas those elements actually abut each other. The second portion 828 of the conductive body 822 has a first compensation conductor 834 projecting outward from an edge 825 that is opposite to the fold axis 824. The first compensation conductor 834 is aligned with the positive tab 804 on the second electrode assembly 800. Similarly, the first portion 826 of the conductive body 822 has a second compensation conductor 836 projecting outward from its edge 829 that is opposite to the fold axis 824. The second compensation conductor 836 is aligned with the negative tab 806 on the second electrode assembly 800. Note that the fold axis 824 is parallel to the roll axis 808 about which the electrode assembly is spirally wound.

The ratios of the two dimensional conductivity of each of the two magnetic compensation structure conductors 834 and 836 to the magnetic compensation structure body 822 may be substantially identical to the corresponding ratios of two dimensional conductivity of each of the positive and negative tabs 804 and 806 to the positive and negative electrodes, respectively, in the second electrode assembly 800. In the particular embodiment in FIG. 8, those ratios are one. This use of identical two dimensional conductivity ratios creates equal current densities in both first the electrode assembly and in the magnetic compensation structure.

When the second magnetic compensation structure 820 is attached to the second electrode assembly 800, the edge from which the compensation conductors 834 and 836 extend is aligned with the edge of the second electrode assembly from which the positive and negative tabs 804 and 806 project. In that combination, the positive tab 804 is electrically connected directly to the first compensation conductor 834. The negative tab 806 and the second compensation conductor 836 are spaced apart by the thickness of the second magnetic compensation structure 820 and the positive electrode and intermediate spacer sheet in the second electrode assembly 800. As a consequence, electrical isolation exists between the negative tab 806 and the second compensation conductor 836. The second compensation conductor 836 now forms the positive terminal of the combined structure. In the assembled battery, a conductive element (not shown) connects the second compensation conductor 836 to the positive terminal 250 of the battery case 240 in FIG. 2, and another conductive element (not shown) connects the negative tab 806 to the negative terminal 260.

When electric current flows through the battery, the pattern of electric current flowing through the second portion 828 of the second magnetic compensation structure 820 is anti-parallel to the electric current pattern in the outer layer of the positive electrode of the second electrode assembly 800. Likewise the pattern of electric current flowing through the first portion 826 second magnetic compensation structure 820 is anti-parallel to the electric current pattern in the out layer of the second electrode assembly's negative electrode. Therefore, the current patterns are matched and the net magnetic field emanating from the battery is reduced.

As is evident from FIG. 10, the second magnetic compensation structure 820 does not necessarily extend across the entire depth of the outer surface of the second electrode assembly 800, which depth is perpendicular to the side 838 from which the positive and negative tabs 804 and 806 project. The second magnetic compensation structure 820 covers the portion of outer layer of the second electrode assembly 800 in which electric currents in the positive and negative electrodes are unmatched. In other words, the second magnetic compensation structure 820 should extend far enough from the side 838 so as to reach a region in the outer layer where the currents in the positive and negative electrodes become effectively anti-parallel, e.g. the region in FIG. 9 beginning with the arrows in row 940. The configuration of other electrode assemblies may require that the magnetic compensation structure wraps around the side of the electrode assembly that is opposite side 838.

The folded second magnetic compensation structure 820 has different current flow patterns in each the first and second portions which patterns match the current flow pattern in the electrodes of the second electrode assembly 800. Looked at another way, an unmatched current flow is created in the second magnetic compensation structure 820 that matches the unmatched current flow in the second electrode assembly 800. The unmatched current pattern in the second magnetic compensation structure 820 produces a magnetic field that is opposed to the magnetic field produced by the unmatched current pattern in the second electrode assembly 800, thus reducing the magnetic noise from the battery.

Figure 11:
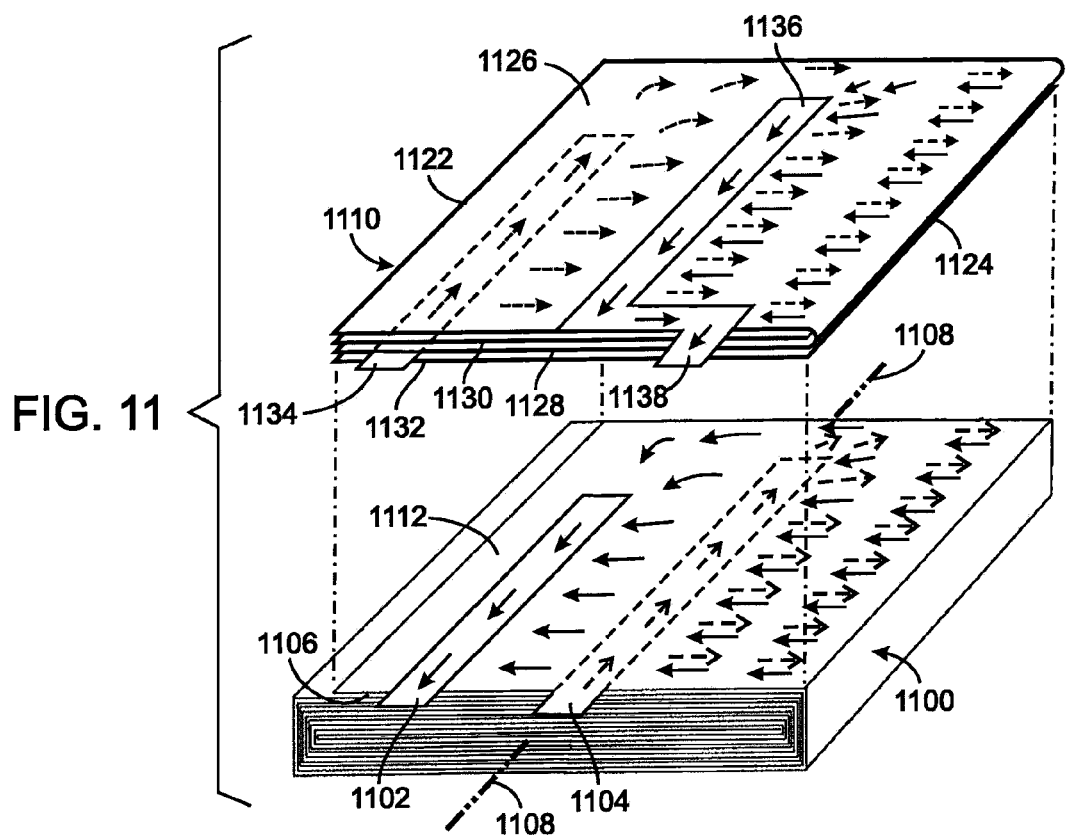
FIG. 11 is an exploded view of third electrode assembly that is similar to FIG. 4, except the tabs do not extend across the entire width of the electrodes.

With reference to FIG. 11, a third electrode assembly 1100 has a jellyroll configuration similar to the first electrode assembly 300 shown in FIG. 8, in which the electrodes are wound spirally about an roll axis 1108. The third electrode assembly, however, differs in that the positive and negative tabs 1102 and 1104, respectively, do not extend across the entire width of the respective electrode from one edge to the other, but extend only partially across the electrode from a first edge 1106. As a consequence, the current flow between the two tabs 1102 and 1104 is not parallel as in the first electrode assembly and the current flow on the remote side of the negative tab 1104 from the positive tab 1102 also is not parallel or perpendicular to the length dimension of the tabs. Of importance to noise mitigation, is that the patterns of electric current in the positive and negative electrodes in this assembly are not matched and thus a first magnetic field is produced in the top layer of the third electrode assembly 1100 in the vicinity of the tabs.

To mitigate the magnetic noise that would otherwise be produced by the third electrode assembly 1100, a third magnetic compensation structure 1110 is placed in close proximity to the top layer 1112 of the electrode assembly. Because all the current in either the positive or negative electrode in the third electrode assembly 1100 does not flow in parallel, the third magnetic compensation structure 1110 has a folded configuration with two adjacent portions through which the current flows. Thus, each portion has a current flow pattern therein that mirrors the current flow pattern in one of the positive or negative electrodes.

The third magnetic compensation structure 1110 has a conductive body 1122 formed by a sheet of electrically conductive material, such as the same material used for the positive electrode. The sheet of the body 1122 is folded along a fold axis 1124 so as to provide an upper first portion 1126 and a lower second portion 1128 in parallel planes. An insulating intermediate separator 1130 is sandwiched between the two portions. An insulating outer separate sheet 1132 forms the lower surface of the third magnetic compensation structure 1110 to provide electrical insulation with respect to the third electrode assembly 1100. It should be understood that for illustrative purposes, gaps are shown between the various elements of the third magnetic compensation structure 1110, whereas those elements actually abut each other. The second portion 1128 of the conductive body 1122 has a first compensation conductor 1134 extending partially across the width of that portion and projecting outward from one edge. The first compensation conductor 1134 has the same dimensions and shape as the positive tab 1102 of the third electrode assembly 1100 and is located on the body 1122 so as to directly overlie that positive tab when the third magnetic compensation structure 1110 is secured to the third electrode assembly. Similarly, the first portion 1126 of the conductive body 1122 has a second compensation conductor 1136 extending partially across the width of that portion. The second compensation conductor 1136 has the same dimensions and shape as the negative tab 1104 of the third electrode assembly 1100 and is located on the body 1122 so as to directly overlie that the negative tab. An offset section 1138 is connected directly to the second compensation conductor 1136 and projects from the one edge of the magnetic compensation structure body 1122.

The ratios of the two dimensional conductivity of each of the two magnetic compensation structure conductors 1134 and 1136 to the magnetic compensation structure body 1122 may be substantially identical to the corresponding ratios of two dimensional conductivity of each of the positive and negative tabs 1102 and 1104 to the positive and negative electrodes, respectively, in the third electrode assembly 1100. This use of identical two dimensional conductivity ratios creates equal current densities in both first the electrode assembly and in the magnetic compensation structure.

The configuration of the folded conductive body 1122 and the first and second compensation conductors 1134 and 1136 is such that current that is conveyed into the third electrode assembly 1100 flows in a pattern through the second portion 1128 that mirrors the current flow pattern in the positive electrode of the third electrode assembly 1100. Current likewise flows through the first portion 1126 of the folded conductive body 1122 in a pattern that mirrors the current flow pattern in the negative electrode of the third electrode assembly. Therefore a pattern of unmatched current is produced in the third magnetic compensation structure 1110 that matches the pattern of unmatched current in the third electrode assembly 1100. As a consequence, the first magnetic field that results from the unmatched current in the third electrode assembly is opposed by the second magnetic field that results from the unmatched current in the third magnetic compensation structure. Those two magnetic fields tend to cancel each other thereby mitigating the noise emanating from the battery.

Alternative embodiments of a folded magnetic compensation structure may have a first portion, e.g., the first portion 1126 of the folded conductive body 1122, made from the same material as the positive electrode and the second portion e.g., the second portion 1128, made from the same material as the negative electrode with the two different materials abutting at the fold. Additional alternative embodiments may have a second portion, e.g., the second portion 1128 of folded conductive body 1122, positioned on one side of an electrode assembly with a first portion, e.g., the first portion 1126, positioned on an alternate side of the electrode assembly. For example, the second portion may be positioned beneath the electrode assembly and the first portion on top of the electrode assembly, such that the electrode assembly is juxtaposed between the second portion and first portion of the magnetic compensation structure (not shown).

The foregoing description was primarily directed to one or more exemplary embodiments of the battery. Although some attention was given to various alternatives within the scope of the disclosure, it is anticipated that one skilled in the art will likely realize additional alternatives that are now apparent from the foregoing description. Accordingly, the scope of the disclosure herein should be determined from the following claims and not limited by the foregoing description of exemplary embodiments.

The invention claimed is:

1. An apparatus comprising:
   an electrode assembly including a positive electrode connected directly to a positive tab, and including the negative electrode spaced from the positive electrode and connected directly to a negative tab;
   a layer of electrolyte between the positive electrode and the negative electrode, for producing an electric current between the negative electrode and the positive electrode; and
   a magnetic compensation structure proximate to the electrode assembly and comprising:
   (a) a base of electrically conductive material;
   (b) a first conductor electrically connected to the base and spaced from the positive tab and the positive electrode, a first ratio of two dimensional conductivity between the first conductor and the base being substantially similar to a second ratio of two dimensional conductivity between the positive tab and the positive electrode;
   (c) a second conductor electrically connected to the base and spaced from the second conductor, negative tab and the negative electrode, a third ratio of two dimensional conductivity between the second conductor and the base being substantially similar to a fourth ratio of two dimensional conductivity between a negative tab and a negative electrode.

2. The apparatus as recited in claim 1 wherein the first conductor has a same size and shape as the positive tab and entirely overlies the positive tab; and the second conductor has a same size and shape as the negative tab and entirely overlies the negative tab.

3. The apparatus as recited in claim 1 wherein the base comprises a sheet of electrically conductive material that is folded over on itself, thereby defining a first portion and a second portion of the base, and wherein the first conductor is connected to the first portion and the second conductor is connected to the second portion.

4. The apparatus as recited in claim 3 further comprising electrical insulating material between the first and second portions of the base.

5. The apparatus as recited in claim 3 wherein an electric current flow through the first portion matches an electric current flow in the positive electrode, and an electric current flow through the second portion matches an electric current flow in the negative electrode.

6. The apparatus as recited in claim 1 wherein an electric current flow in the positive electrode is unmatched to an electric current flow in the negative electrode thereby producing a first magnetic field.

7. The apparatus as recited in claim 6 wherein an electric current flow through the base, the first conductor and the second conductor produces a second magnetic field that opposes the first magnetic field.

8. The apparatus as recited in claim 6 wherein the electrode assembly has one of a stacked configuration, a pleated configuration, and a spiral configuration.

9. The apparatus as recited in claim 1 further comprising a wireless mobile communication device connected to at least one of the first conductor and the second conductor.

10. An apparatus comprising:
an electrode assembly, for providing electrical power, includes a positive electrode, a negative electrode, a positive tab electrically connected to the positive electrode, a negative tab electrically connected to the negative electrode, and a layer of electrolyte between the positive electrode and the negative electrode, wherein an electric current flow in the positive electrode is unmatched to an electric current flow in the negative electrode thereby producing a first magnetic field; and
a magnetic compensation structure comprising a body of electrically conductive material electrically connected to one of the positive electrode and the negative electrode, a first compensation conductor electrically connected to the body, and a second compensation conductor electrically connected to the body, wherein the first and second compensation conductors are spaced from the positive tab, the positive electrode, the negative tab, and the negative electrode, and wherein an electric current flow from the electrode assembly through the body produces a second magnetic field that opposes the first magnetic field.

11. The apparatus as recited in claim 10 wherein the positive tab and positive electrode are formed of identical material with the positive tab extending outward from an edge of the positive electrode, and the negative tab and negative electrode are formed of identical material with the negative tab extending outward from an edge of the negative electrode.

12. The apparatus as recited in claim 10 wherein a ratio of two dimensional conductivity between the positive tab and the positive electrode is substantially identical to a ratio of two dimensional conductivity between the first compensation conductor and the body of the magnetic compensation structure, and a ratio of two dimensional conductivity between the negative tab and the negative electrode is substantially identical to a ratio of two dimensional conductivity between the second compensation conductor and the body.

13. The apparatus as recited in claim 10 wherein the magnetic compensation structure is positioned adjacent the electrode assembly with the first compensation conductor overlying the positive tab and the second compensation conductor overlying the negative tab.

14. The apparatus as recited in claim 13 wherein either the first compensation conductor is electrically connected to the positive electrode or the second compensation conductor is electrically connected to the negative electrode.

15. The apparatus as recited in claim 10 wherein the first compensation conductor has a same size and shape as the positive tab and entirely overlies the positive tab; and the second compensation conductor has a same size and shape as the negative tab and entirely overlies the negative tab.

16. The apparatus as recited in claim 10 wherein the body of electrically conductive material comprises a sheet that is folded over on itself along a fold axis, thereby defining a first portion and a second portion of the body, and wherein the first compensation conductor is connected to the first portion and the second compensation conductor is connected to the second portion.

17. The apparatus as recited in claim 16 further comprising electrical insulating material between the first and second portions of the body.

18. The apparatus as recited in claim 16 wherein the electrode assembly is rolled in a spiral about a roll axis, and the fold axis of the magnetic compensation structure is parallel to the roll axis.

19. The apparatus as recited in claim 16 wherein an electric current flow through the first portion matches the electric current flow in the positive electrode, and an electric current flow through the second portion matches the electric current flow in the negative electrode.

20. The apparatus as recited in claim 10 wherein:
the positive electrode has a first surface with a first edge and a second edge, the negative electrode has a second surface with a third edge and a fourth edge; the positive tab is electrically connected across the first surface of the positive electrode from the first edge to the second edge, and the negative tab is electrically connected across the second surface from the third edge to the fourth edge; and
the magnetic compensation structure further comprises the first compensation conductor electrically connected to the body and overlying the positive tab of the electrode assembly in a spaced apart manner; and the second compensation conductor electrically connected to the body and overlying the negative tab of the electrode assembly in a spaced apart manner.

21. The apparatus as recited in claim 20 wherein the first compensation conductor has a same size and shape as the positive tab and entirely overlies the positive tab, and the second compensation conductor has a same size and shape as the negative tab and entirely overlies the negative tab.

22. The apparatus as recited in claim 10 further comprising a case enclosing the electrode assembly and the magnetic compensation structure.

23. The apparatus as recited in claim 22 further comprising a positive conductor having a strip shape and extending along a surface of the case to a positive terminal, and a negative conductor having a strip shape extending along the surface of the case to a negative terminal, wherein one of the positive and negative conductors overlies the other one of the positive and negative conductors.

24. The apparatus as recited in claim 23 wherein the positive conductor is between the surface of the case and the negative conductor.

25. The apparatus as recited in claim 10 further comprising a case enclosing the electrode assembly, and wherein the magnetic compensation structure is outside the case.

26. The apparatus as recited in claim 10 wherein the electrode assembly has one of a stacked configuration, a pleated configuration, and a spiral configuration.

27. The apparatus as recited in claim 10 further comprising a wireless mobile communication device connected to the electrode assembly and to the magnetic compensation structure.

28. An apparatus, for providing electrical power, comprising:
- an electrode assembly having a positive electrode, a negative electrode, a layer of electrolyte between the positive electrode and the negative electrode, wherein an electric current flows through the positive electrode in a first pattern and flows through the negative electrode in a second pattern that is unmatched to the first pattern, resulting in an unmatched current pattern in a section of the electrode assembly; and
- a magnetic compensation structure adjacent to the electrode assembly and comprising a body of conductive material spaced from the electrode assembly, a first compensation conductor electrically connected to the body, and a second compensation conductor electrically connected to the body with one of the first compensation conductor and the second compensation conductor electrically connected to one of the positive electrode and the negative electrode, wherein a pattern of current flowing through the body matches the unmatched current pattern in the section of the electrode assembly.

29. The apparatus as recited in claim 28 wherein the electrode assembly is configured in layers and the magnetic compensation structure adjacent to an outer layer of the electrode assembly.

30. The apparatus as recited in claim 28 wherein the electrode assembly further comprises a positive tab electrically connected to the positive electrode, and a negative tab electrically connected to the negative electrode.

31. The apparatus as recited in claim 28 wherein an electric current flowing in the electrode assembly produces a first magnetic field and an electric current flowing in the magnetic compensation structure produces a second magnetic field that opposes the first magnetic field.

32. The apparatus as recited in claim 30 wherein a ratio of two dimensional conductivity between the positive tab and the positive electrode is substantially identical to a ratio of two dimensional conductivity between the first compensation conductor and the body of the magnetic compensation structure, and a ratio of two dimensional conductivity between the negative tab and the negative electrode is substantially identical to a ratio of two dimensional conductivity between the second compensation conductor and the body.

33. The apparatus as recited in claim 30 wherein the first compensation conductor overlies the positive tab, and the second compensation conductor overlies the negative tab.

34. The apparatus as recited in claim 28 wherein either the first compensation conductor is electrically connected to the positive electrode or the second compensation conductor is electrically connected to the negative electrode.

35. The apparatus as recited in claim 28 wherein the body of electrically conductive material comprises a sheet that is folded over on itself along a fold axis, thereby defining a first portion and a second portion of the body, and wherein the first compensation conductor is connected to the first portion and the second compensation conductor is connected to the second portion.

36. The apparatus as recited in claim 35 wherein an electric current flows through the first portion in a pattern that matches the first pattern of current flow in the positive electrode, and an electric current flows through the second portion in another pattern that matches the second pattern of current flow in the negative electrode.

37. The apparatus as recited in claim 35 further comprising electrical insulating material between the first and second portions of the body.

38. The apparatus as recited in claim 35 wherein the electrode assembly is rolled in a spiral about a roll axis, and the fold axis of the magnetic compensation structure is parallel to the roll axis.

39. The apparatus as recited in claim 28 wherein:
- the positive electrode has a first surface with a first edge and a second edge, the negative electrode has a second surface with a third edge and a fourth edge; and the electrode assembly further comprises a positive tab electrically connected across the first surface of the positive electrode from the first edge to the second edge, and a negative tab electrically connected across the second surface from the third edge to the fourth edge; and
- the magnetic compensation structure further comprises a first compensation conductor electrically connected to the body and entirely overlying the positive tab of the electrode assembly; and a second compensation conductor electrically connected to the body and entirely overlying the negative tab of the electrode assembly.

40. The apparatus as recited in claim 28 further comprising a case enclosing the electrode assembly and the magnetic compensation structure.

41. The apparatus as recited in claim 40 further comprising a positive conductor having a strip shape extending along a surface of the case to a positive terminal, and a negative conductor having a strip shape extending along the surface of the case to a negative terminal, wherein one of the positive and negative conductors overlies the other one of the positive and negative conductors.

42. The apparatus as recited in claim 28 further comprising a case enclosing the electrode assembly, and wherein the magnetic compensation structure is outside the case.

43. The apparatus as recited in claim 28 further comprising a wireless mobile communication device connected to the electrode assembly and to the magnetic compensation structure.

44. The apparatus as recited in claim 30 wherein the first compensation conductor has a same size and shape as the positive tab and entirely overlies the positive tab; and the second compensation conductor has a same size and shape as the negative tab and entirely overlies the negative tab.

* * * * *